(12) United States Patent
Smith et al.

(10) Patent No.: US 7,762,616 B2
(45) Date of Patent: Jul. 27, 2010

(54) CROSS-MEMBER FOR A TRAILER FRAME AND A TRAILER FRAME INCORPORATING THE SAME

(75) Inventors: Fred P. Smith, Alpine, UT (US); Nathan H. Morrill, Draper, UT (US)

(73) Assignee: Sidump'r Trailer Company, Inc., Plainview, NE (US)

( * ) Notice: Subject to any disclaimer, the term of this patent is extended or adjusted under 35 U.S.C. 154(b) by 267 days.

(21) Appl. No.: 12/119,194

(22) Filed: May 12, 2008

(65) Prior Publication Data
US 2008/0303312 A1    Dec. 11, 2008

Related U.S. Application Data

(60) Provisional application No. 60/933,455, filed on Jun. 6, 2007.

(51) Int. Cl.
*B60P 1/28* (2006.01)
(52) U.S. Cl. ............ 296/184.1; 296/183.2; 296/187.08; 296/193.07; 296/204; 296/205; 280/784; 280/791; 180/311

(58) Field of Classification Search ............... 296/183.2, 296/184.1, 187.08, 193.07, 205; 180/311; 280/784, 791
See application file for complete search history.

(56) References Cited

U.S. PATENT DOCUMENTS

| | | | | |
|---|---|---|---|---|
| 3,735,998 A | * | 5/1973 | Green, Leon K. ............ | 296/204 |
| 4,355,844 A | * | 10/1982 | Fantini Muzzarelli ....... | 296/205 |
| 5,914,163 A | * | 6/1999 | Browne ....................... | 296/205 |
| 6,588,830 B1 | * | 7/2003 | Schmidt et al. .............. | 180/311 |
| 7,340,832 B2 | * | 3/2008 | Crean .......................... | 296/204 |

* cited by examiner

*Primary Examiner*—Lori L Lyjak
(74) *Attorney, Agent, or Firm*—Sand & Sebolt (57) ABSTRACT

A cross-member for a trailer frame and a frame incorporating the same. The cross-member extends between longitudinally aligned rails designed to pivotally support a dumping body thereon. The cross-member includes a cylindrical tube having a wall defining a bore therethrough. A planar member is received within the bore and is axially aligned therewith. The tube includes one or more axially aligned openings proximate a central region thereof. The planar member is disposed intermediate the openings and is aligned axially with the openings. The cross-member is substantially rigid under tension and at least a portion thereof is flexible under torsion.

21 Claims, 6 Drawing Sheets

CROSS-MEMBER FOR A TRAILER FRAME AND A TRAILER FRAME INCORPORATING THE SAME

CROSS-REFERENCE TO RELATED APPLICATIONS

This is a standard utility application claiming priority from U.S. Provisional Application Ser. No. 60/933,455, filed Jun. 6, 2007, the entire specification of which is incorporated herein by reference.

BACKGROUND OF THE INVENTION

1. Technical Field

This invention generally relates to trailers. More particularly the invention relates to cross-members of semi-trailers. Specifically, the invention relates to a cross-member for a trailer that comprises an elongate tube with a planar member extending through the bore thereof and being connected to an interior surface thereof, and where the cross-member is relatively inflexible in bending and tension, while remaining relatively flexible overall in torsion.

2. Background Information

Trailer frames usually consist of two longitudinal frame rails that are joined together by cross-members at intervals along their length. The cross-members are essential not only to hold the longitudinal rails together, but are also used at points where concentrated loads are put into the longitudinal rails, such as the regions on the frame where the kingpin, suspension and body are mounted. Trailers, particularly trailers designed to carry construction materials such as gravel, asphalt, boulders, debris, etc., may be taken over terrain that is not very smooth. When the tires on one side of the trailer are raised or lowered with respect to the other side of the trailer and to the kingpin, such as during diagonal axle-walk, a relative twist is put into the longitudinal rails. This twisting motion, or torsion, can lead to failure of the rails and/or members of the frame.

Generally, there are two approaches to handling twisting between the longitudinal rails. The first approach is that the frame cross-members can be made torsionally strong and rigid in order to resist sizeable twisting loads. Torsionally rigid cross-members will tend to have a solid or tubular cross-sectional shape that is generally of a circular or square configuration. One problem experienced with torsionally rigid cross-members is that the torque, carried from one side of the trailer to the other by the cross-members, also induces a stress into the rails. This stress is frequently at the same position as the maximum, or nearly maximum, bending stress. Making trailer frame cross-members strong enough and rigid enough to resist these substantial twisting loads usually requires that additional material or a different material be used to construct the cross-members. These cross-members are often manufactured to be heavier and/or stronger. Using additional or costlier materials tends to raise the overall price of the trailer, thus reducing the profit margin for the manufacturer. Also, using additional materials has the side-effect of reducing the possible legal payload that the trailer can ultimately carry because of weight restrictions. This tends to cut into the operator profits.

The second approach taken to handling twisting is to make the frame cross-members torsionally flexible so that they tend to flex and bend under sizeable twisting loads. Flexible cross-members typically have an open-type of cross-sectional shape, such as that of an I-beam or a member with a channel along its length. However, utilizing flexible cross-members to resist the twisting loads also has shortcomings. This is particularly true when the cross-members are used for supporting primarily vertical loads such as attaching the body to the frame. If the vertical load is supported at a lateral position, i.e., at a position other than directly over the longitudinal frame rails, then a bending moment and its consequent bending stress are induced in the cross-member at its connection zone with the longitudinal frame. In these instances, the maximum torsional stress induced by the twist between the two longitudinal frame rails will also tend to coincide with the maximum bending stress as is the case with torsionally rigid cross-members. This combination of stresses can lead to failure of the rails and cross-members of the trailer.

There is therefore a need in the art for an improved cross-member for use in the manufacture of trailer frames.

SUMMARY OF THE INVENTION

The device of the present invention is an improved cross-member for use in the manufacture of trailer frames, and a trailer frame incorporating the same. The cross-member extends between longitudinally aligned rails designed to pivotally support a dumping body thereon. The cross-member includes a cylindrical tube having a wall defining a bore therethrough. A planar member is received within the bore and is axially aligned therewith. The tube includes one or more axially aligned openings proximate a central region thereof. The planar member is disposed intermediate the openings and is axially aligned with the openings. The cross-member is substantially rigid under tension with a portion thereof generally flexible and a portion generally rigid under torsion.

Consistent with the foregoing and in accordance with the invention as embodied and broadly described herein, the device of the present invention is described with reference to longitudinal, lateral and transverse directions as indicated in the figures attached hereto. Most trailer frames consist of two main frame rails that extend substantially parallel to each other along the majority of the trailer length in a longitudinal direction. Cross-members run laterally and generally orthogonal to the frame rails. The present invention is a cross-member that at least spans the distance between two longitudinally aligned frame rails. The cross-member of the present invention may extend laterally beyond the frame rails.

In the present invention the planar member is similar to the web of an I-beam. The tube has portions removed to form one or more openings or windows that face substantially in the longitudinal direction and are generally parallel to the planar member within the bore of the tube. The planar member provides strength and rigidity to the cross-member and the openings in the tube wall provide torsional flexibility to the cross-member. When a trailer is loaded under different conditions, it is sometimes necessary for the cross-members to be stiff in some deflection modes and flexible in other deflection modes. The cross-member in accordance with the present invention is relatively stiff or rigid in tension in the lateral direction and in bending about a longitudinal axis. The cross-member of the present invention is torsionally rigid about an axis extending from the longitudinal frame rail partially toward the center between the longitudinal members and relatively torsionally flexible in a substantially central portion between the two longitudinal frame rails, i.e., the cross-member is torsionally rigid proximately its outer ends and torsionally flexibly proximate its middle region. Portions of the cross-members which extend laterally outwardly beyond the frame rails may be torsionally rigid or torsionally flexible. One advantage of this type of construction is that the maximum torsional stresses and maximum bending stresses occur in different areas of the cross-member. This results in a cross-member that can be lighter in weight without increasing the maximum combined stress in the cross-member. None of the prior art has this combination of flexibility and stiffness in the aforementioned deflection modes.

In one embodiment of the present invention, the cross-members extend through apertures in the trailer's frame rails, and the protruding ends of the cross-members may be coupled with the dumping body. Thus larger bending and torsional loads may be applied to the cross-member of the present invention with the same resulting combined stress than was possible in cross-members of the prior art. Applying these loads to a cross-member in accordance with the present invention, will cause the distribution of the load and reduce the stresses in the frame rails and in the cross-members.

BRIEF DESCRIPTION OF THE DRAWINGS

The foregoing features of the present invention will become more fully apparent from the following description and appended claims, taken in conjunction with the accompanying drawings. Understanding these drawings depict only typical embodiments of the invention and are, therefore, not to be considered limiting of its scope, the invention will be described with additional specificity and detail through use of the accompanying drawings in which:

DETAILED DESCRIPTION OF THE INVENTION

It will be readily understood that the components of the instant invention, as generally described and illustrated in FIGS. 1, 2, 3, 7A and 7B herein, could be arranged and designed in a wide variety of different configurations. But, the following more detailed description of the invention, as represented in these aforementioned figures is not intended to limit the scope of the invention as claimed, but is merely representative of possible embodiments of the invention. The prior art is shown in FIGS. 4A-6B.

Figure 1:
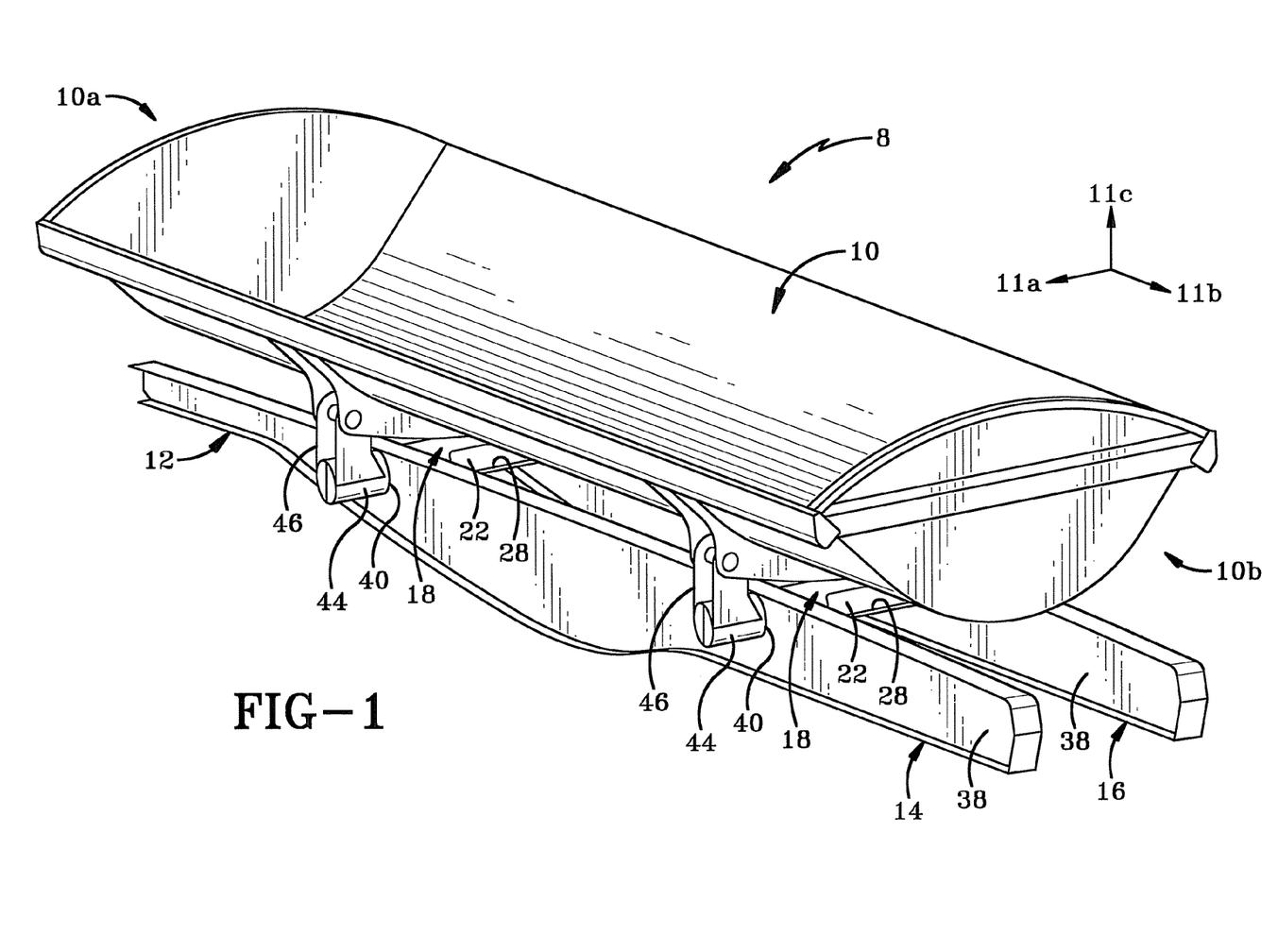
FIG. 1 is an isometric view a trailer having a side dumping body where the trailer incorporates a flexible cross-member in accordance with the present invention.

Referring to FIG. 1, there is shown a trailer 8 that includes a dumping body 10 pivotally mounted on a trailer frame 12. Trailer frame 12 comprises a pair of spaced apart frame rails 14, 16. Frame rails 14, 16 are connected to each other by way of one or more cross-members 18 in accordance with the present invention.

Figure 2:
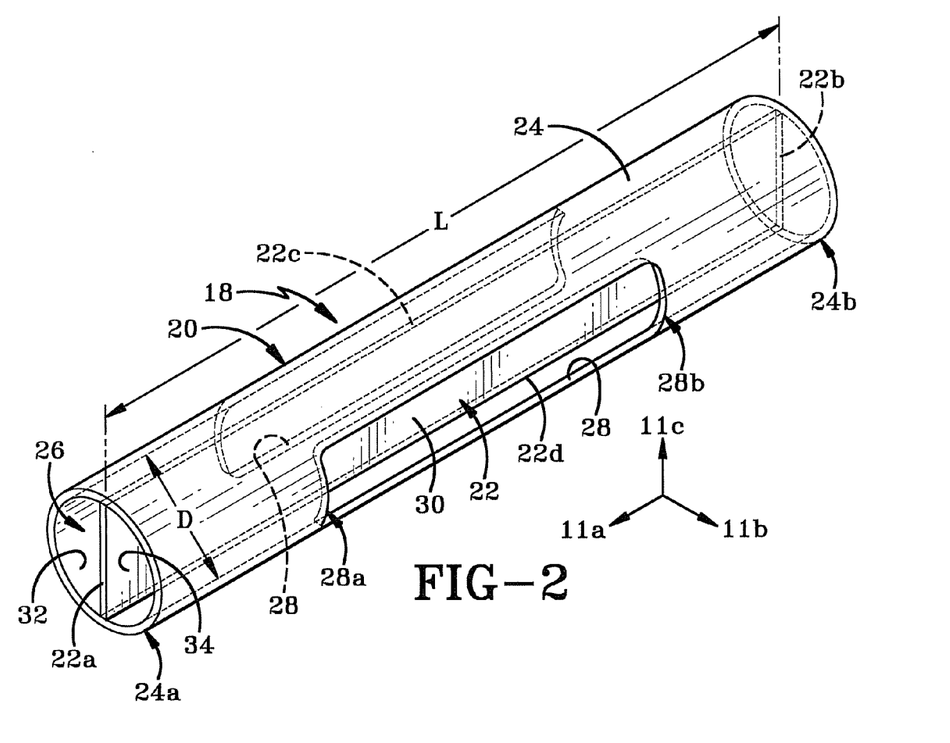
FIG. 2 is an isometric view of the trailer cross-member in accordance with the present invention.

A reference axis is shown in FIGS. 1 and 2 and is herein defined in order to aid in describing the present invention. A lateral direction is indicated by arrow 11a, a longitudinal direction is indicated by arrow 11b and a transverse direction is indicated by arrow 11c. A lateral axis of cross-member 18 is aligned along lateral direction 11a. A longitudinal axis of trailer 8 and frame rails 14, 16 is aligned along longitudinal direction 11b, and a transverse axis, which is mutually orthogonal with the longitudinal and lateral axes 11b, 11a, is aligned along transverse direction 11c. The lateral, longitudinal, and transverse axes and directions will be represented hereinafter in this description as 11a, 11b, and 11c respectively.

Figure 3:
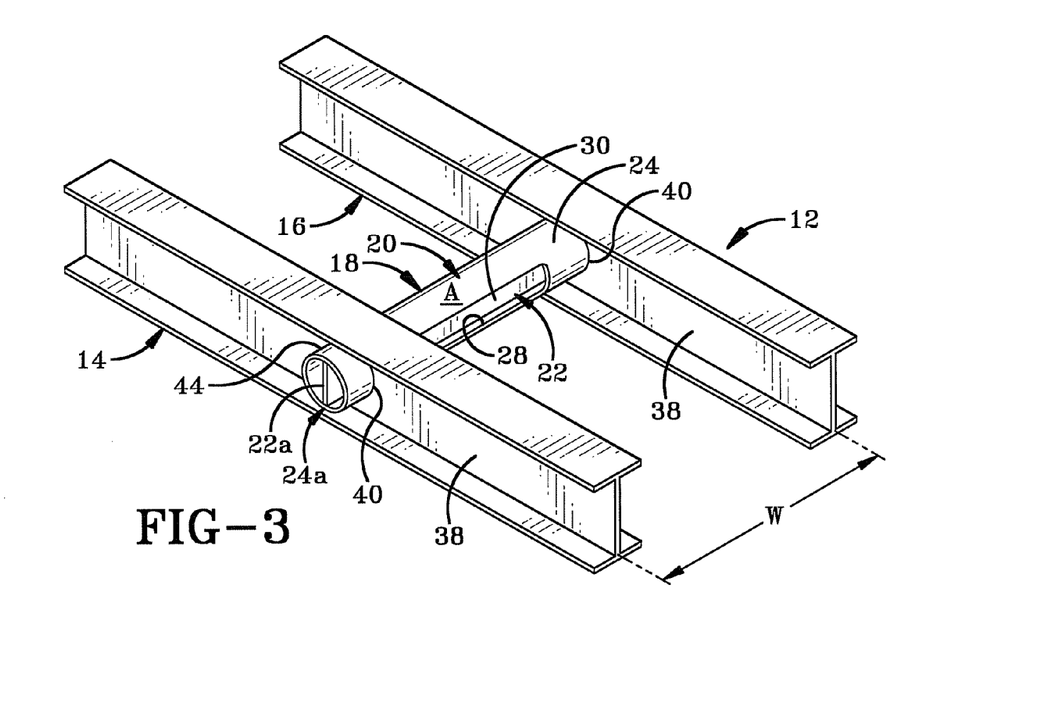
FIG. 3 is an isometric view of a portion of a trailer frame comprising a pair of frame rails and a cross-member extending therebetween.

FIGS. 2 and 3 show a cross-member 18 in accordance with the present invention. Cross-member 18 comprises a generally cylindrical tube 20 and a planar member 22. Tube 20 has a peripheral wall 24 that is of a circular cross-sectional shape. Wall 24 has a first end 24a and a second end 24b and is of a length "L". Wall 24 defines a bore 26 therethrough that is of a diameter "D". Bore 26 extends from first end 24a through to second end 24b. Tube 20 extends laterally between frame rails 14 and 16 and has a lateral axis 11a that extends between first and second ends 24a, 24b.

In accordance with a specific feature of the present invention, at least one, and preferably two windows or openings 28 are defined in wall 24. Windows 28 extend laterally along wall 24 and have an origin region at 28a and a termination region at 28b. Windows 28 are generally parallel to lateral axis 11a of tube 20. Origin and termination regions 28a, 28b are spaced a distance inwardly from first and second ends 24a, 24b respectively. As shown in FIG. 3, when cross-member 18 is secured to rails 14, 16, the two windows 28 are situated intermediate rails 14, 16 with the origin and termination regions 28a, 28b thereof being spaced a distance inwardly of rails 14, 16. FIG. 2 shows wall 24 defining two windows 28 therein that are spaced circumferentially equidistant from each other in wall 24. The origin regions 28a of the two windows 28 and the termination regions 28b thereof are substantially aligned with each other in the longitudinal direction 11b. Each window 28 opens toward one of the front end 10a and back end 10b of trailer 10 as shown in FIG. 1. Windows 28 are provided to reduce the overall weight of cross-member 18 and give cross-member 18 a greater torsional flexibility than would be the case if peripheral wall 24 was substantially solid. Windows 28 significantly reduce the torsional stiffness about lateral axis 11a in a middle portion A (FIG. 3) of tube 20. Windows 28 do not reduce the torsional stiffness at the ends 24a, 24b of tube 20. Windows 28 also allow access for planar member 22 to be welded to tube 20.

In accordance with yet another specific feature of the present invention, planar member 22 is received within bore 26 of cross-member 18. Planar member 22 has a first end 22a, a second end 22b and lateral edges 22c, 22d. A web 30 extends between lateral edges 22c, 22d. Web 30 has a length that preferably is substantially equal to length "L" of tube 20. Web 30 further has a height extending between lateral edges 22c and 22d that is substantially equivalent to diameter D of tube 20. Web 30 is thus tightly received within bore 26. Web 30 effectively divides tube 20 into two substantially semicircular chambers 32, 34 (FIG. 2). Preferably, first end 22a of planar member 22 is substantially coplanar with first end 24a of tube 20 and second end 22b of planar member 22 is substantially coplanar with second end 24b of tube 20. Web 30 of planar member 22 preferably extends in a transverse direction 11c. Furthermore, web 30 and windows 28 are generally parallel to each other and to lateral axis 11a. Windows 28 allow access for planar member 22 to be welded to the inner surface of tube 20. Planar member 22 adds significant stiffness in the lateral direction 11a and significant bending stiffness about longitudinal axis 11b. However, planar member 22 adds relatively little torsional stiffness about lateral axis 11a and relatively little bending stiffness about transverse axis 11c.

Cross-member 18 spans the distance "W" between frame rails 14, 16. Frame rails 14, 16 preferably each include a web 38 (FIG. 3) that defines an aperture 40 therein. Apertures 40 are laterally aligned with each other. Apertures 40 are complementary sized and shaped to receive an end 24a, 24b of cross-member 18 therein. A portion of tube 20 may extend laterally outwardly beyond web 38 of rails 14, 16. This portion is indicated at 44 (FIG. 1). A mounting apparatus 46 for dumping body 10 attaches to portion 44 of cross-member 18. Because windows 28 are intermediate frame rails 14, 16, portions 44 of cross-members 18 are relatively strong and stiff on the outside of frame rails 14, 16. This strength is necessary to handle the loads on the mounting apparatus 46 due to the mass of dumping body 10 and the mass of the cargo (not shown) to be carried therein.

Figure 4A:
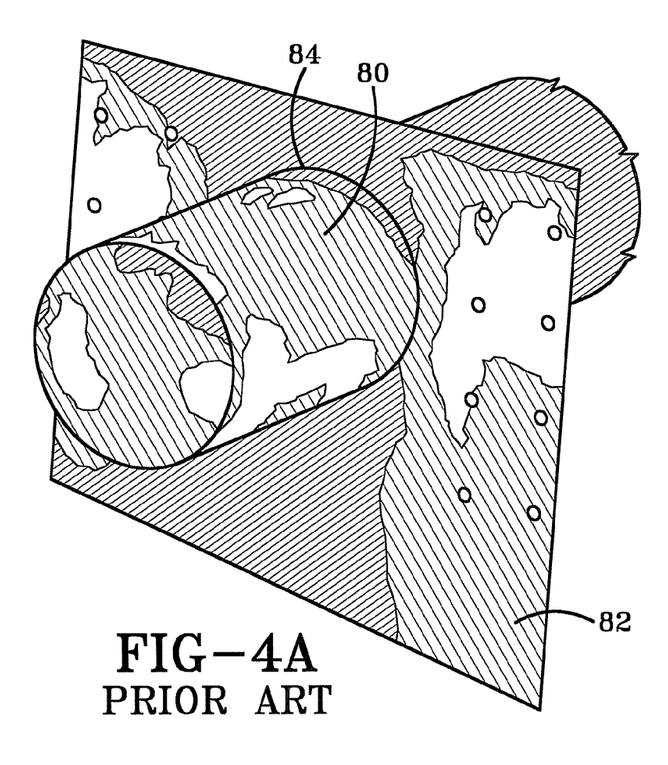
FIG. 4A is a perspective view of a portion of a prior art cross-member and frame rail, wherein the cross-member is a thin-walled cylindrical tube, and illustrating the degree to which this type of cross-member is stressed when the trailer frame is subjected to a twisting load, such as having the wheels on one side of the trailer being lifted.
Figure 4B:
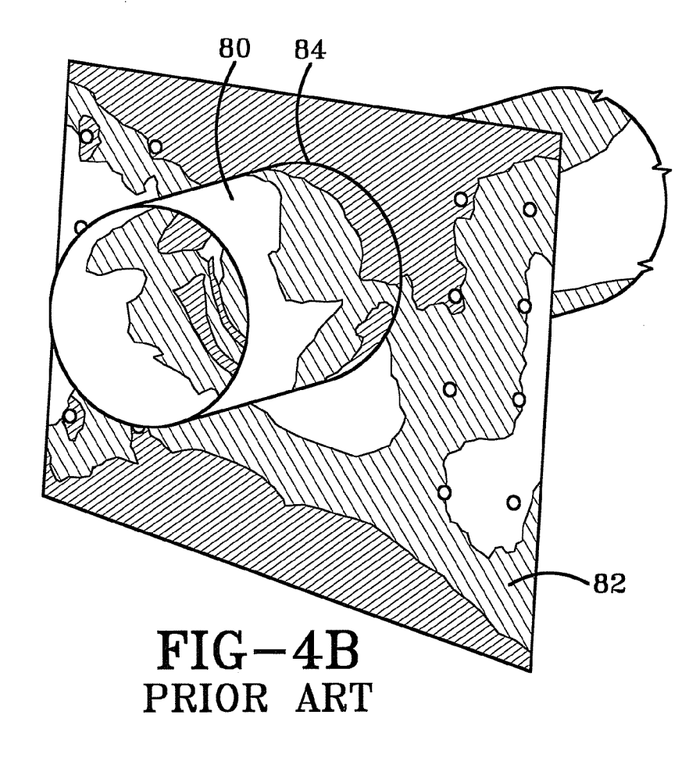
FIG. 4B is a perspective view of a portion of the cross-member and frame rail of FIG. 4A illustrating the degree of stress in the cross-member and frame rail when a load is dumped from a load body supported by the trailer frame.
Figure 6A:
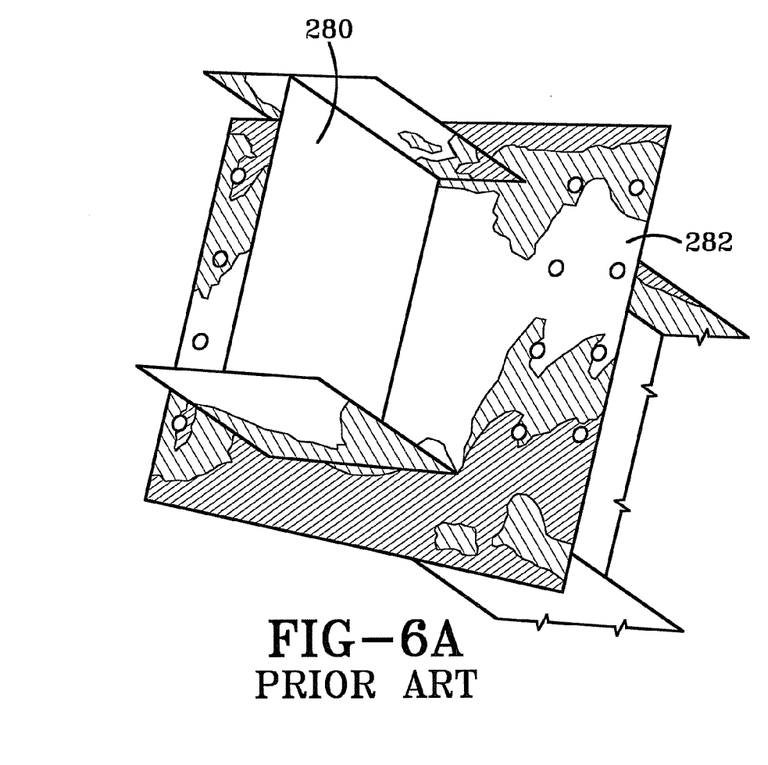
FIG. 6A is a perspective view of a portion of yet another prior art cross-member and frame rail, where the cross-member is an I-beam, and illustrating the degree to which this type of cross-member is stressed when the trailer frame is subjected to a twisting load.
Figure 6B:
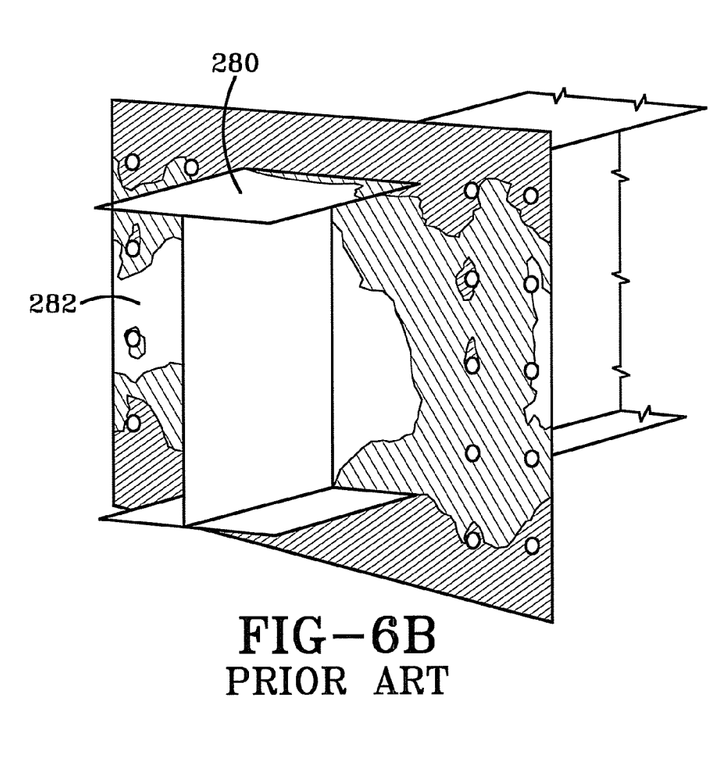
FIG. 6B is a perspective view of the prior art cross-member and frame rail of FIG. 6A illustrating the degree of stress in the cross-member and frame rail when a load is dumped from a load body supported by the trailer frame.
Figure 7A:
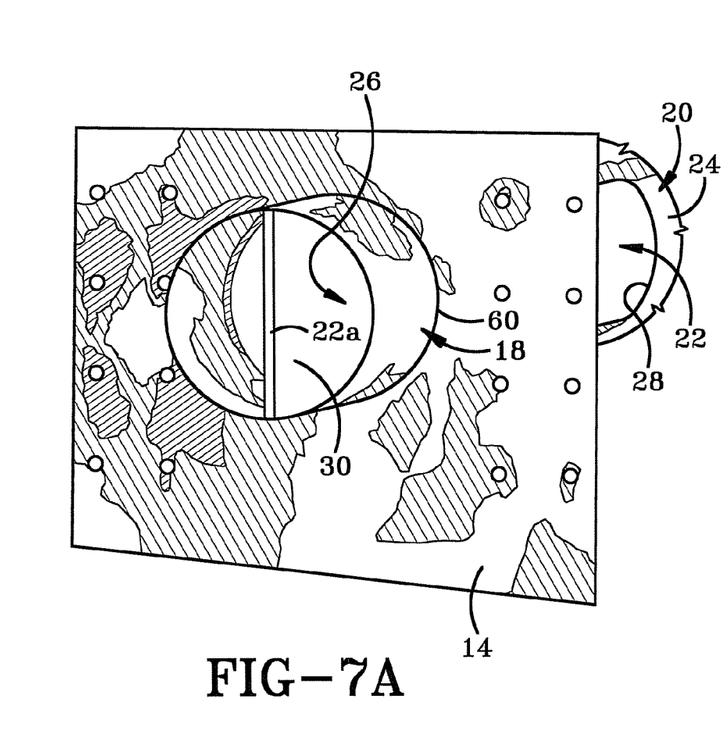
FIG. 7A is a perspective view of a portion of the cross-member and frame rail in accordance with the present invention and illustrating the degree to which this type of cross-member is stressed when the trailer frame is subjected to a twisting load.
Figure 7B:
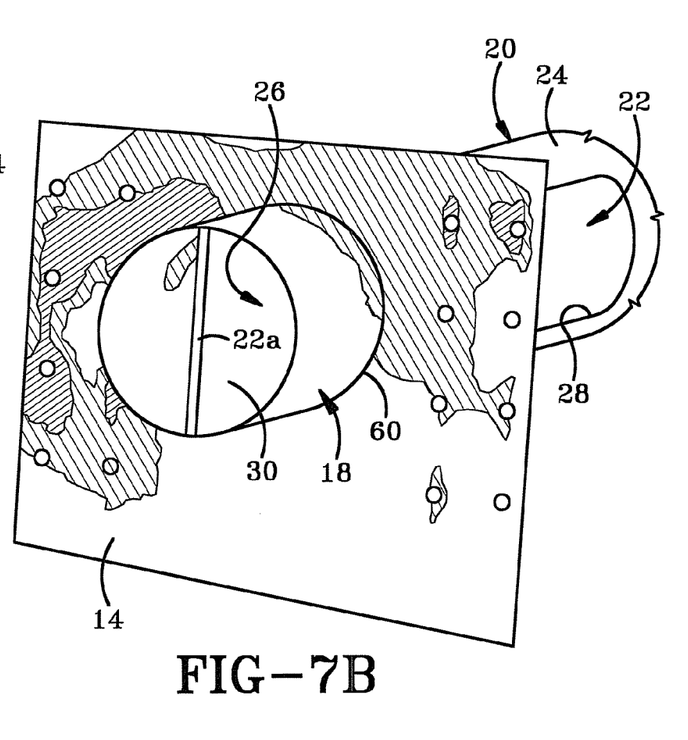
FIG. 7B is a perspective view of the cross-member and frame rail of FIG. 7A illustrating the degree of stress in the cross-member and frame rail when a load is dumped from a load body supported by the trailer frame.

The advantages of the present invention are readily apparent when the stresses in the prior art are compared to the stresses in the present invention. FIGS. 4A-6B illustrate the possible stresses in the cross-members 80 and frame rails 82 disclosed in the prior art while FIGS. 7A-7B illustrate the possible stresses in cross-members 18 and frame rails 14, 16 of the present invention. The stresses experienced in any of these systems may be calculated using Finite Element Analysis or FEA. For the purposes of illustration only, three prior art cross-members are shown, namely, a thin-walled tube 80 having a circular cross-sectional shape extending from a frame rail 82 (FIGS. 4A, 4B), a thick-walled tube 180 having a circular cross-sectional shape in a frame rail 182 (FIGS. 5B, 5B), and an I-beam 280 in a frame rail 282 (FIG. 6A, 6B). An example of the possible stresses experienced in these systems is shown by the degree of hatching surrounding the connection zones between the end of the cross-member 80, 180 and 280 and frame rails 82, 182 and 282. The greater the illustrated stress level, the closer the hatching on the illustration. FIGS. 4A, 5B, 6A show the stresses in the prior art cross-members 80, 180 and 280 when a twisting load is applied to the frame 82, 182, 282 by having the wheels on one side of the trailer lifted off the ground. FIGS. 4B, 5B and 6B show the stresses in the prior art cross-members 80, 180, 280 and frame rails 82, 182, 282 when the load carried in the dumping body on the trailer is being dumped. These possible illustrated stresses in prior art devices can be compared with the illustration of possible stresses that may be experienced in the cross-member 18 and frame rail 14 of the present invention. FIG. 7A shows the possible stresses in cross-member 18 of the present invention when a twisting load is applied to the trailer frame by having the wheels on one side of the trailer lifted off the ground. FIG. 7B shows the possible stresses in the region of the weld, or connection zone 60, of cross-member 18 and rail 14 when the load (not shown) carried in the dumping body is being dumped.

The stresses illustrated in all of these figures show a critical level indicated by the closest hatching in the figure. In FIG. 4A, for example, based on the illustrated stress levels, the structure is most likely to fail at the welds 84. The stresses near the weld 84 in the thin round cross-member 80 are used as a baseline for this comparison.

Figure 5A:
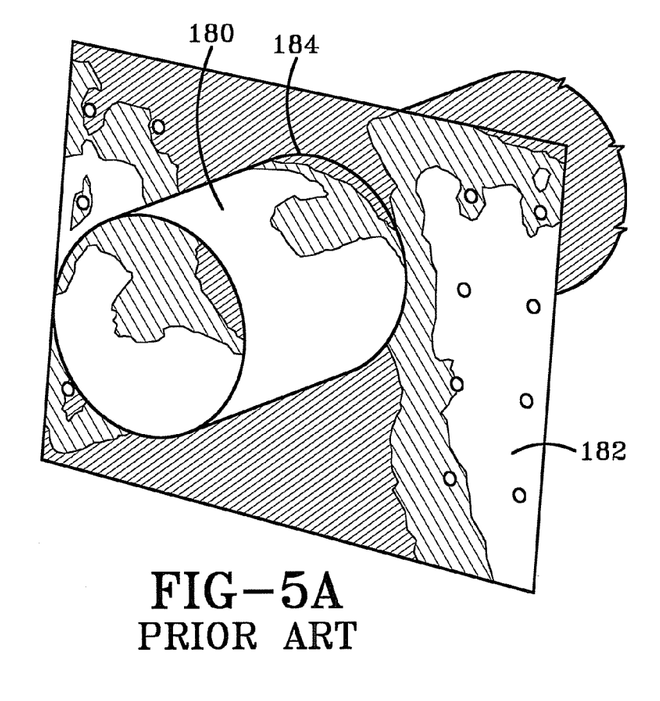
FIG. 5A is a perspective view of a portion of another prior art cross-member and frame rail, wherein the cross-member is a thick-walled cylindrical tube, and illustrating the degree to which this type of cross-member is stressed when the trailer frame is subjected to a twisting load.
Figure 5B:
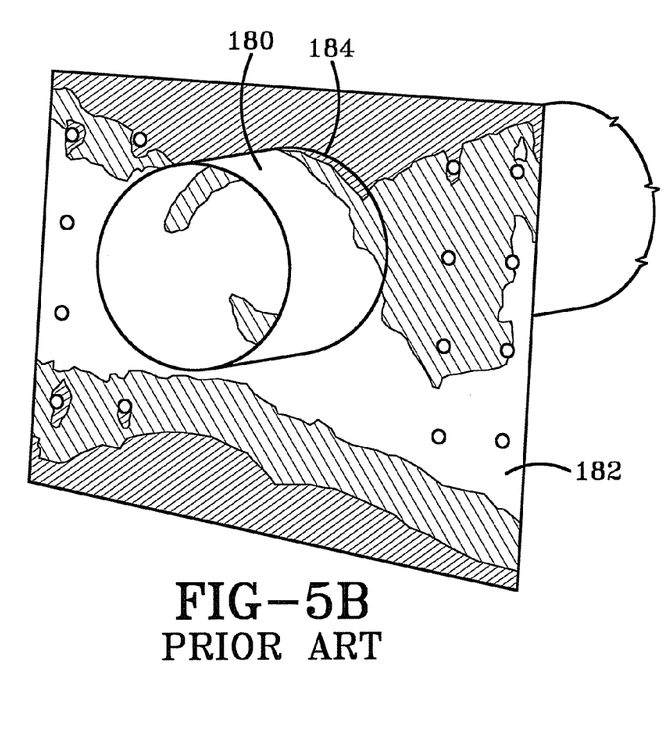
FIG. 5B is a perspective view of the prior art cross-member and frame rail of FIG. 5A illustrating the degree of stress in the cross-member and frame rail when a load is dumped from a load body supported by the trailer frame.

As shown in FIG. 5B, using the thick-walled tube 180 tends to lower the stresses near the weld 184 under dumping loads, but has very little effect on the maximum stress near the weld 184 under twisting loads shown in FIG. 5A.

As shown in FIGS. 6A, 6B, using an I-beam for the cross-member 280 tends to lower the stresses under dumping loads (FIG. 6B), but increases the stresses under twisting loads (FIG. 6A).

As shown in FIGS. 7A, 7B, using the cross-member 18 of the present invention tends to lower the stresses near the weld 60 to beneath the reference level for both loading conditions as selected previously in reference to FIG. 4A.

The present invention may be embodied in other specific forms without departing from its essential characteristics. The described embodiments are to be considered in all respect only as illustrative and not restrictive. The scope of the invention, therefore, is indicated by the appended claims. All changes within the meaning and range of equivalency of the claims are to be embraced within their scope.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention are an example and the invention is not limited to the exact details shown or described.

The invention claimed is:

1. A cross-member for a trailer frame; said cross-member comprising:
    a cylindrical tube having a peripheral wall defining a bore therethrough, said wall having a lateral axis extending between a first end and a second end of the tube; said tube being adapted to be received between a pair of longitudinally aligned rails; and
    an elongate planar member received within the bore of the tube; said planar member comprising a web having a first end and a second end and a first and a second edge extending therebetween.

2. The cross-member as defined in claim 1, wherein the peripheral wall further defines at least one laterally aligned first opening therein.

3. The cross-member as defined in claim 2, wherein the first opening originates a spaced distance inwardly from the first end of the tube and terminates a spaced distance inwardly from the second end of the tube, whereby a portion of the tube extends laterally between each of said first and second ends and said opening; and wherein said portions are adapted to be relatively inflexible as compared to a mid-portion of the tube proximate the first opening when the cross-member is under torsion.

4. The cross-member as defined in claim 2, wherein the first opening has a circumferentially oriented width and a laterally oriented length, and the length is greater than the width.

5. The cross-member as defined in claim 4, wherein the peripheral wall further defines a laterally aligned second opening therein, and said second opening is circumferentially spaced from the first opening.

6. The cross-member as defined in claim 5, wherein the first and second openings are spaced equidistant from each other around the circumference of the peripheral wall.

7. The cross-member as defined in claim 2, wherein the planar member is disposed within the bore of the tube such that the planar member is substantially aligned along the longitudinal axis thereof, whereby the tube is effectively divided into two semi-circular chambers and the planar member is disposed equidistant from the openings.

8. The cross-member as defined in claim 1, wherein the first end of the tube is substantially coplanar with the first end of the planar member; and the second end of the tube is substantially coplanar with the second end of the planar member.

9. The cross-member as defined in claim 1, wherein the bore of the tube is of a first diameter, and wherein the planar member has a height extending between the first and second edges; and wherein the height of the planar member is substantially equal to the first diameter.

10. The cross-member as defined in claim 1, wherein the first and second edges of the planar member are in abutting engagement with an interior surface of the tube; and wherein at least one of the first and second edges is fixedly secured to the interior surface.

11. A trailer frame for pivotally supporting a dumping body thereon, said trailer frame comprising:
  a pair of spaced apart rails, said rails being oriented substantially parallel to a longitudinal axis disposed therebetween;
  a first cross-member extending laterally between the rails and substantially at right angles to the longitudinal axis thereof; wherein said cross-member comprises:
    a cylindrical tube having a peripheral wall which defines a bore of a first diameter therethrough; said tube having a first and a second end and a lateral axis extending therethrough;
    a planar member received within the bore of the tube and extending laterally therethrough.

12. The trailer frame as defined in claim 11, wherein the peripheral wall defines a laterally aligned first opening therein, and wherein said first opening originates a spaced distance inwardly from the first end of the tube and terminates a spaced distance inwardly from the second end of the tube.

13. The trailer frame as defined in claim 12, wherein the peripheral wall further defines a laterally aligned second opening therein, and said second opening is circumferentially spaced from the first opening.

14. The trailer frame as defined in claim 13, wherein the planar member has a height that extends between the first and the second lateral edges; and wherein the height is substantially equal to the first diameter.

15. The trailer frame as defined in claim 14, wherein the planar member is oriented substantially at right angles to the lateral axis and is disposed equidistant from the first and second openings and generally parallel thereto.

16. The trailer frame as defined in claim 12, wherein the first opening in the peripheral wall is disposed intermediate the first and second ends of the tube and spaced a distance inwardly from an interior surface of each of the two rails.

17. The trailer frame as defined in claim 11, wherein each of the rails includes a web that is disposed at right angles to the longitudinal and the lateral axes of the rails and cross-member respectively, and wherein the web of each rail defines a laterally-oriented aperture therein; each aperture being complementary to receive one of the first and second ends of the cross-member therein; and wherein the apertures are laterally aligned with each other.

18. The trailer frame as defined in claim 17, wherein the rails are disposed a first width apart from each other; and wherein the first width is smaller than a length of the tube as measured between the first and second end thereof; whereby a portion of the tube extends through at least one of the apertures and laterally outwardly beyond at least one of the rails.

19. The trailer frame as defined in claim 18, wherein a portion of the tube extends through each of the apertures and laterally outwardly beyond each of the rails; and wherein said portion of the tube is adapted to engage a pivotal attachment mechanism for securing the dumping body to the trailer frame.

20. The trailer frame as defined in claim 19, wherein the portions of the cross-member that extend outwardly beyond the rails are substantially inflexible in bending, tension and torsion proximate the connection zone with the rails, while remaining substantially flexible in torsion overall.

21. The trailer frame as defined in claim 12, wherein the cross-member is substantially rigid in torsion about an axis extending from one of the rails and partially toward a central region of the cross-member disposed between the spaced-apart frame rails; and wherein said cross-member is torsionally flexible in the central region between the two rails and adjacent the first opening in the cross-member.

* * * * *